United States Patent
Strain

(10) Patent No.: US 9,598,154 B2
(45) Date of Patent: Mar. 21, 2017

(54) FLOAT

(71) Applicant: Michael Strain, Munster, IN (US)

(72) Inventor: Michael Strain, Munster, IN (US)

(*) Notice: Subject to any disclaimer, the term of this patent is extended or adjusted under 35 U.S.C. 154(b) by 0 days.

(21) Appl. No.: 14/871,034

(22) Filed: Sep. 30, 2015

(65) Prior Publication Data

US 2016/0096596 A1   Apr. 7, 2016

Related U.S. Application Data

(60) Provisional application No. 62/058,175, filed on Oct. 1, 2014.

(51) Int. Cl.
*B63B 35/34* (2006.01)
*B63B 35/73* (2006.01)
*B63B 35/38* (2006.01)
*B63B 35/44* (2006.01)

(52) U.S. Cl.
CPC ............ *B63B 35/732* (2013.01); *B63B 35/34* (2013.01); *B63B 35/38* (2013.01); *B63B 35/44* (2013.01); *B63B 2035/4426* (2013.01)

(58) Field of Classification Search
CPC ....... B63B 35/34; B63B 35/732; B63B 35/44; B63B 35/73; E02B 3/064

USPC .................. 114/44, 263, 267; 405/218, 219
See application file for complete search history.

(56) References Cited

U.S. PATENT DOCUMENTS

| | | | | |
|---|---|---|---|---|
| 3,446,172 A | * | 5/1969 | Douglass | E02B 3/064 114/267 |
| 4,993,350 A | * | 2/1991 | Pepper | B63B 1/121 114/267 |
| 5,799,916 A | * | 9/1998 | Lechner | F16L 1/24 114/267 |
| 6,021,730 A | * | 2/2000 | Carey, II | B63B 35/34 114/263 |
| 6,035,797 A | * | 3/2000 | Robinson | B63B 5/24 114/263 |
| 6,752,097 B1 | * | 6/2004 | Elson | B63B 5/24 114/267 |

* cited by examiner

*Primary Examiner* — Lars A Olson

(74) *Attorney, Agent, or Firm* — Michael Best & Friedrich LLP

(57) ABSTRACT

A novel float that can be constructed in pieces. Each piece providing buoyancy and when joined together able to provide floatation for a structure. The float having containers that can serve as storage for different materials. The floats making a system used to float a large structure such as a home.

10 Claims, 2 Drawing Sheets

FLOAT

CROSS-REFERENCE TO RELATED APPLICATIONS

The present application claims the benefit of U.S. Provisional Patent Application No. 62/058,175, filed Oct. 1, 2014, the entirety of which is hereby incorporated by reference.

BACKGROUND

Americans live in homes of all types. More and more people are enjoying the benefits of living in houseboats. The 2000 census found some 200,000 houseboats located in the United States. Because of the anticipated increase in population it is expected that more and more people will live in houseboats. Sometimes these will be their primary home, and other times these will be used as a second home for recreation and relaxation.

The increasing demand for floating structures, such as houseboats, leaves buyers wanting for more. Features usually included in land based homes are becoming desirable in houseboats. So, for instance, toilets, showers, sinks, dishwashers, clothes dryers, clothes washers, coffee makers, and trash compactors are a few of the amenities that people want in their houseboats.

One problem with today's houseboats is that they do not provide an easy means for handling the unwanted items of people in the home or the accessories that are part of the houseboat. Fecal waste and urine, for instance, are often collected in a separate container and vacuumed or siphoned off from that container when a boat reaches dock. The waste container serves no other purpose and takes up valuable space in the boat's design. Another problem is that construction of the floats for floating structures, a houseboat for example, is limited by size or shape if done as one piece construction.

There is a need in the industry for an apparatus that is easily incorporated into a houseboat design, is multifunctional, and uses space that is already reserved for another purpose. A further need is for the ability to construct floats that are not limited by size, such as by length or by shape.

SUMMARY

My present invention is directed to an apparatus and process that satisfies this need, the utility of which is characterized by floating containers that are easily pieced together and provide other related functionality such as storage, readouts, and easy assembly. This is the first floating container system with flexible use material storage, modular construction, and useful instrumentation functionality for floating structures, such as a house.

I have invented a novel float comprising at least one container. The container can be a cylinder, a pontoon for instance, that is sufficiently sealed and buoyant. The at least one container is sufficiently hollow and can float, the at least one container can be filled with a float assisting material such as foam. In a preferred embodiment the walls of the container are made of 0.5 inch plastic material and include ridges around its outer surface which add strength. The foam filled container would add buoyancy. Any one of the at least one containers could be made to store materials, such as human waste to name one example. The container has affixed to its outer surface at least one panel. The panel is a location where various instrumentation can be placed. The container has passing through its surface, through a sealable port to name one example, at least one tube. The sealable port can be sealed with special breathable material to allow for changes in pressure and temperature while still preventing the intake of water. The tube is used to channel materials from outside to the inside of the container or vice versa. There is at least one fastener that is fixedly attached to the container. The at least one fastener is used to connect several of the containers together. This would be done if one wants to form a long pontoon for instance. The long pontoon then becomes one made of several containers and can be used to float large structures, such as a house, bridge, or platform to name a few examples.

One embodiment of the apparatus allows for use of several containers. The containers are differently configured. This allows for some but not all of the containers to have storage segments. Such an option is useful when only a few material storing containers are needed.

Another embodiment of the apparatus allows several containers to be fastened together and yet have space between each container. Such a configuration allows for flexibility and lessens the noise associated with joined containers. It is an intended aspect of one embodiment of the invention to be used to float a house. Configured are three rows of containers, floats, where the containers are attached together by an aluminum stringer, and several layers of planks affixed to the top side of the three rows of floats. A house being fastened to the top of this configuration.

Another embodiment of the present invention is an instrumented storage and flotation system which comprises at least one flotation compartment and at least one storage compartment. The flotation compartment is shaped with a flat surface to accommodate the placement of a stringer material, such as a long metal plate. The embodiment includes an instrument panel having a fill gauge indicating available space in one or more of the compartments. The at least one storage compartment includes a sealable port configured to enable insertion and extraction of material to and from the at least one storage compartment. The sealable port is able to seal, for instance via the use of a rubber grommet, the at least one storage compartment sufficiently to maintain buoyancy. The at least one flotation compartment is at least partly filled with buoyant material to ensure buoyancy, such as a foam or similar material. Importantly, the at least one storage compartment includes a fill tube configured to facilitate insertion and extraction of materials within the compartment, fluid for instance. In a preferred example, the at least one flotation compartment and the at least one storage compartment are connected together by fastening components such that each compartment is spaced apart from another compartment forming a whole flotation device that is capable of supporting large structures, such as a home, and keeping the structure afloat.

Another embodiment of the present invention entails an instrumented storage and flotation system configured to support a structure on a body of water, a lake or ocean for instance. This embodiment includes a plurality of compartments including a flotation compartment and a storage compartment. The plurality of compartments being connected together by fastening components that separate each compartment from another compartment. Here too, the storage compartment would include a fill gauge indicating available space in the storage compartment, as well as a sealable port enabling insertion and extraction of material to and from the storage compartment. The plurality of compartments being reconfigurable to include more or less flotation compartments, more or less storage compartments, and more or less compartments in the plurality. This plurality of components being partially submerged in the body of water beneath the supported structure, such as a house or bridge. Again, as in other embodiments, the flotation compartment is at least partly filled with buoyant material such as a foam.

A more specifically described embodiment of the present invention includes a houseboat comprising living quarters and an instrumented storage and flotation system configured to support the houseboat on a body of water. This system comprises a plurality of compartments including a flotation compartment and a storage compartment. The plurality of compartments being connected together by fastening components, a metal bar with fasteners for instance, that separate each compartment from another compartment. The storage compartment would include a fill gauge indicating available space in the storage compartment. The panel where the fill gauge is located would also accommodate other instrumentalities as needed to accommodate the monitoring of various systems, depth, direction, or other instruments commonly used in boating. There is a a sealable port enabling insertion and extraction of material to and from the storage compartment. This plurality of compartments being reconfigurable to include more or less flotation compartments, more or less storage compartments, and more or less compartments in the plurality. Obviously the system would include the plurality of components being partially submerged in the body of water beneath the houseboat. The houseboat would include the flotation compartment being at least partly filled with buoyant material, such as a foam or any versatile floatation material.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DESCRIPTION

Figure 1:
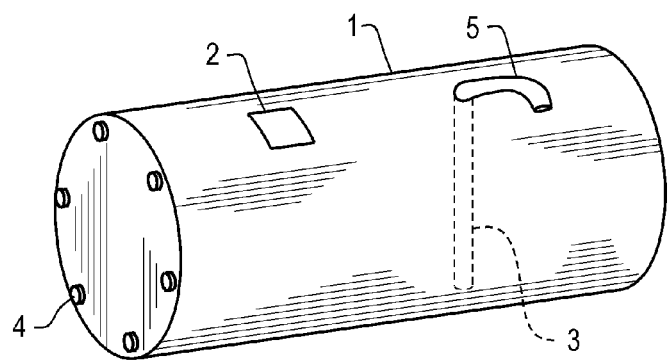
FIG. 1 shows a perspective view of one embodiment of the invention.

As shown in FIG. 1, one embodiment of the invention comprises a container 1, a panel 2, a tube 5, passing through the container 1 and having a portion 3 within the container 1. The container 1 having a plurality of fasteners 4.

Figure 2:
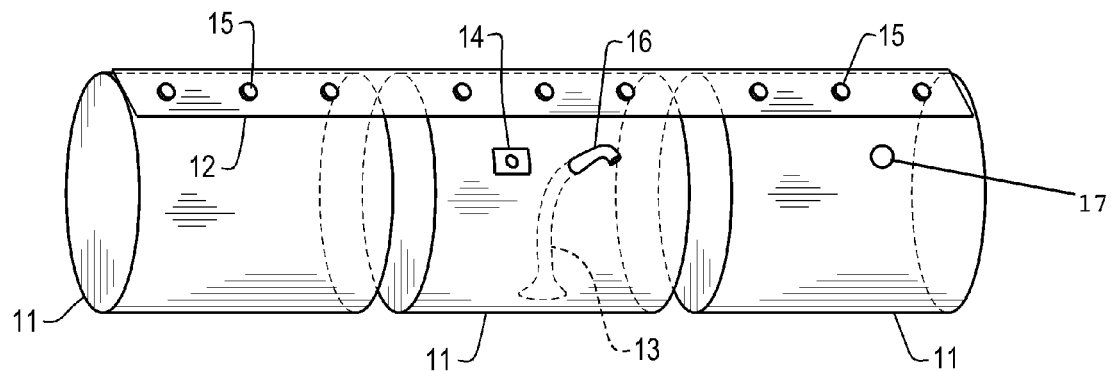
FIG. 2 shows a perspective view of another embodiment of the invention with joined floats.

As shown in FIG. 2, another embodiment of the invention with joined floats comprises a plurality of containers 11. The plurality of containers 11 being joined together by a stringer 12. The stringer 12 being fastened by a plurality of bolts 15, or alternatively by other fasteners such as screws, adhesive, nails, or rivets. At least one container from the plurality of containers having a panel 14 for instrumentation. This instrumentation might be electronics or analog meters giving indications or controlling other parts integral to the structure. One example of instrumentation 14 is a liquid level gauge. A tube 16 passing through a sealable port of at least one of the containers 11 and having an inside portion 13 for handling material. One of the containers is shown to be without a tube and instead having a sealable port that is capped off 17, this can be with a solid cap or with a breathable material.

Figure 3:
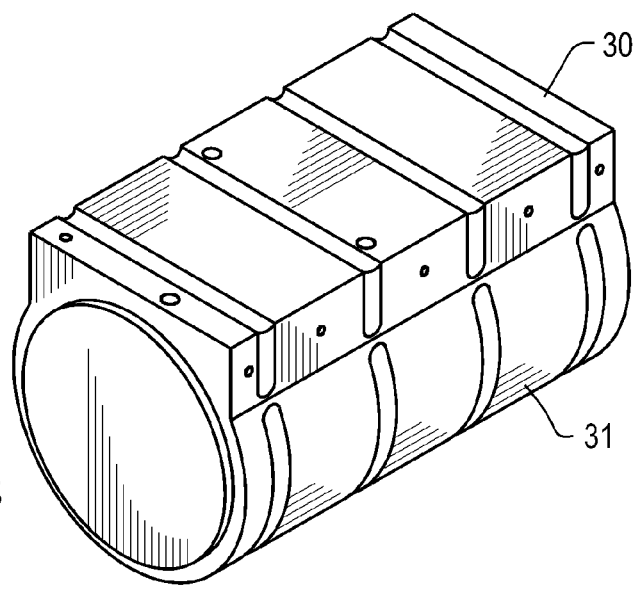
FIG. 3 shows a perspective view of another embodiment of the invention.

As shown in FIG. 3, another embodiment of the invention comprises a flotation compartment 31. The floatation compartment being shaped so as to form a flat surface 30 for placement of a stringer 12 shown in FIG. 2.

Figure 4:
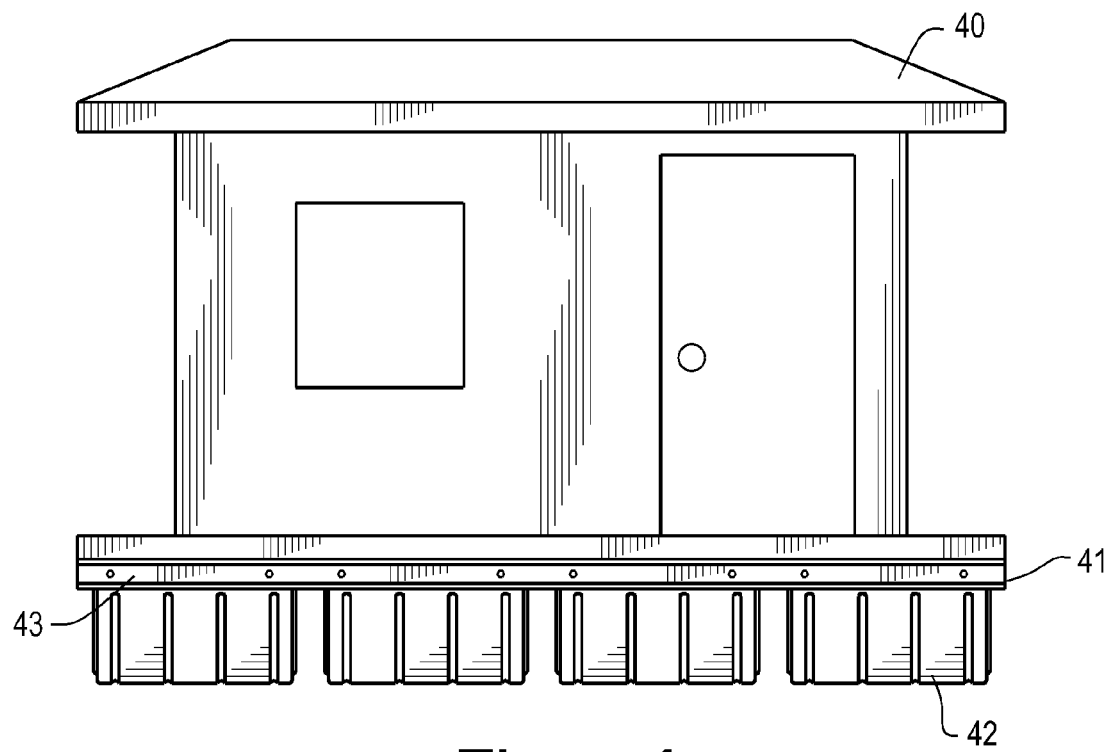
FIG. 4 shows a perspective view of another embodiment of the invention showing a structure afloat.

As shown in FIG. 4, another embodiment of the invention showing a structure afloat comprises a structure, that is a house 40. The house is attached and supported by the system which comprises a plurality of storage and flotation compartments 42. The compartments are attached to one another via a metal stringer 41. The Stringer being placed upon the substantially flat side of the compartments 43. The house 40 sits atop the system and is able to be held afloat.

Although the present invention has been described in considerable detail with the reference to certain preferred versions thereof, other versions are possible. For example, the compartments could be connected by threaded ends. Another version might include containers that have sealable ports that are used for one way ventilation only. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What I claim is:

1. An instrumented storage and flotation system, the system comprising:
   at least one flotation compartment and at least one storage compartment;
   an instrument panel;
   the instrument panel including a fill gauge indicating available space in one or more of the compartments;
   the at least one storage compartment including a sealable port configured to enable insertion and extraction of material to and from the at least one storage compartment;
   the sealable port sealing the at least one storage compartment sufficiently to maintain buoyancy.

2. The system of claim 1, wherein the at least one flotation compartment is at least partly filled with buoyant material to ensure buoyancy.

3. The system of claim 2, wherein the buoyant material is foam.

4. The system of claim 1, wherein the at least one storage compartment includes a fill tube configured to facilitate insertion and extraction of fluid.

5. The system of claim 1, wherein the at least one flotation compartment and the at least one storage compartment are connected together by fastening components such that each compartment is spaced apart from another compartment.

6. An instrumented storage and flotation system configured to support a structure on a body of water, the system comprising:
   a plurality of compartments including a flotation compartment and a storage compartment;
   the plurality of compartments being connected together by fastening components that separate each compartment from another compartment;
   the storage compartment including a fill gauge indicating available space in the storage compartment, and sealable port enabling insertion and extraction of material to and from the storage compartment;

the plurality of compartments being reconfigurable to include more or less flotation compartments, more or less storage compartments, and more or less compartments in the plurality; and the plurality of components being partially submerged in the body of water beneath the supported structure.

7. The system of claim 6, wherein the flotation compartment is at least partly filled with buoyant material.

8. The system of claim 7, wherein the buoyant material is foam.

9. A houseboat comprising:

living quarters; and an instrumented storage and flotation system configured to support the houseboat on a body of water, the system comprising:

a plurality of compartments including a flotation compartment and a storage compartment;

the plurality of compartments being connected together by fastening components that separate each compartment from another compartment;

the storage compartment including:

a fill gauge indicating available space in the storage compartment, and a sealable port enabling insertion and extraction of material to and from the storage compartment;

the plurality of compartments being reconfigurable to include more or less flotation compartments, more or less storage compartments, and more or less compartments in the plurality; and the plurality of components being partially submerged in the body of water beneath the houseboat.

10. The houseboat of claim 9, wherein the flotation compartment is at least partly filled with buoyant material.

* * * * *